United States Patent
Wang et al.

(10) Patent No.: US 9,519,132 B2
(45) Date of Patent: Dec. 13, 2016

(54) ELECTROWETTING DISPLAY DEVICE AND METHOD FOR PREPARING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Mingchao Wang, Beijing (CN); Junwei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 214 days.

(21) Appl. No.: 14/413,369

(22) PCT Filed: Apr. 28, 2014

(86) PCT No.: PCT/CN2014/076384
§ 371 (c)(1),
(2) Date: Jan. 7, 2015

(87) PCT Pub. No.: WO2015/035786
PCT Pub. Date: Mar. 19, 2015

(65) Prior Publication Data
US 2016/0274352 A1    Sep. 22, 2016

(30) Foreign Application Priority Data

Sep. 10, 2013   (CN) .......................... 2013 1 0409821

(51) Int. Cl.
*G02B 26/00* (2006.01)
*C23F 1/00* (2006.01)

(52) U.S. Cl.
CPC ............... *G02B 26/005* (2013.01); *C23F 1/00* (2013.01)

(58) Field of Classification Search
CPC ..... G02B 26/005; G02B 26/004; G02B 26/02; G02B 26/00; G02B 2207/115; G02B 1/06; G09G 3/348
(Continued)

(56) References Cited

U.S. PATENT DOCUMENTS

2013/0155480 A1   6/2013  Lee et al.
2013/0170008 A1   7/2013  Shin et al.

FOREIGN PATENT DOCUMENTS

CN   102692778 A    9/2012
CN   202615040 U   12/2012
(Continued)

OTHER PUBLICATIONS

International Search Report and Written Opinion mailed Aug. 5, 2014 regarding PCT/CN2014/076384.
(Continued)

*Primary Examiner* — Mahidere Sahle
(74) *Attorney, Agent, or Firm* — Harness, Dickey & Pierce, P.L.C.

(57) ABSTRACT

The present invention discloses an electrowetting display device and a method for preparing the same. The electrowetting display device comprises several fluid chambers and a polar fluid accommodated in the fluid chambers, wherein the fluid chamber comprises a base; the base comprises a first electrode and a second electrode that are insulated from each other and an electro-conversion film, wherein the electro-conversion film is located on one side of the first electrode that is adjacent to the polar fluid; and wherein the contact angle between the electro-conversion film and the polar fluid converts in the range from a first contact angle to a second contact angle according to the magnitude of a voltage applied; the first contact angle is no larger than 25 degrees, and the second contact angle is no less than 90 degrees.

16 Claims, 4 Drawing Sheets

(58) Field of Classification Search
 USPC .................................................. 359/290–297
 See application file for complete search history.

(56) References Cited

FOREIGN PATENT DOCUMENTS

| | | |
|---|---|---|
| CN | 102955247 A | 3/2013 |
| CN | 103257445 A | 8/2013 |
| CN | 103258502 A | 8/2013 |
| CN | 103558685 A | 2/2014 |
| EP | 2631698 A1 | 8/2013 |
| WO | 2012098987 A1 | 7/2012 |
| WO | 2012108463 A1 | 8/2012 |

OTHER PUBLICATIONS

Chinese Office Action dated Mar. 23, 2015 regarding Chinese Application No. 201310409821.6. Translation provided by Dragon Intellectual Property Law Firm.

ELECTROWETTING DISPLAY DEVICE AND METHOD FOR PREPARING THE SAME

CROSS-REFERENCE TO RELATED APPLICATION

This application is the U.S. national phase of PCT Application No. PCT/CN2014/076384 filed on Apr. 28, 2014, which claims priority to Chinese Patent Application No. 201310409821.6 filed on Sep. 10, 2013, the disclosures of which are incorporated in their entirety by reference herein.

FIELD OF THE INVENTION

The present invention relates to the field of displays, and in particular, to an electrowetting display device and a method for preparing the same.

DESCRIPTION OF THE PRIOR ART

An existing electrowetting display device includes: a fluid chamber, a polar fluid and a nonpolar fluid accommodated in the fluid chamber, and electrodes provided on the opposite two sides of the fluid chamber, wherein the electrodes form a part of the fluid chamber. The voltage between the two electrodes are changed to vary the electrowetting effect of the polar fluid on at least one side of the fluid chamber, so that the nonpolar fluid is prompted to expand or shrink by the shape and displacement phenomenon of the polar fluid. The presentation of the dark state of an electrowetting display is realized by the expanding of the nonpolar fluid, and the presentation of the bright state of an electrowetting display is realized by the shrinking of the nonpolar fluid, and color combination is realized in conjunction with the structure of a color filter, etc., thereby a color image may be displayed.

Although the display of an image can be realized by an electrowetting display device of the above structure, there exist the following problems.

Firstly, an electrode contacts a polar fluid directly, and the electric energy acts on the polar fluid directly, so that physical or chemical change tends to occur on the polar fluid after a certain display times. For example, when the polar fluid is water, water electrolysis reaction tends to occur. However, water electrolysis reaction is an irreversible reaction, so that the polar fluid will be reduced, thereby the life time of the electrowetting display device will be shortened, and at the same time, the later display effect of the electrowetting display device will be influenced.

Secondly, a part of the voltage that acts on the polar fluid is used for other physical or chemical changes, which causes a large electric energy consumption. For example, when the polar fluid is water, a part of the electric energy is used for water electrolysis reaction.

SUMMARY OF THE INVENTION

As directed to the above problems, it is an object of the invention to provide an electrowetting display device, thereby the stability of the polar fluid can be improved, the service life of the display device can be prolonged, and the power consumption can be lowered.

Further, the invention also provides a method for preparing an electrowetting display device.

To attain the above objects, the invention provides an electrowetting display device, which comprises several fluid chambers and a polar fluid accommodated in the fluid chambers;

wherein, the fluid chamber comprises a base, and the base comprises a first electrode and a second electrode that are insulated from each other and an electro-conversion film, wherein the electro-conversion film is located on one side of the first electrode that is adjacent to the polar fluid;

wherein, a contact angle between the electro-conversion film and the polar fluid converts in the range from a first contact angle to a second contact angle according to a voltage applied to the first electrode;

the first contact angle is no larger than 25 degrees, and the second contact angle is no less than 90 degrees.

Optionally, the first contact angle is no larger than 10 degrees, and the second contact angle is no less than 150 degrees.

Optionally, the electro-conversion film is formed of molecules comprising a hydrophilic group and a hydrophobic group, wherein the hydrophilic group comprises a thiol group and a carboxyl group; and the hydrophobic group comprises one or more of an alkyl, a benzene ring and a fluorine group.

Optionally, a nonpolar fluid is further provided in the fluid chamber, and the fluid chamber is divided into a shrinking region and an expanding region, wherein the shrinking region is configured for the aggregation of the nonpolar fluid, and the electro-conversion film is located in the expanding region.

Optionally, the first electrode is located in the expanding region.

Optionally, the polar fluid is water, and the nonpolar fluid is a pigment-containing oil layer.

To attain the above objects, the invention further provides a method for preparing the above electrowetting display device, which comprises:

forming a pattern including a second electrode on a first substrate;

forming a pattern including a first electrode that is insulated from the second electrode; and forming a pattern including an electro-conversion film on the pattern including a first electrode.

Further, the method for preparing an electrowetting display device further comprises:

forming a retaining wall of the fluid chamber on the pattern including an electro-conversion film;

providing a polar fluid and a nonpolar fluid in the fluid chamber; and oppositely arranging a second substrate and the first substrate on which the above steps have been performed, to form a cell.

The electrowetting display device according to the invention and the method for preparing the same have the following beneficial effects: in an electrowetting display device according to the invention or in an electrowetting display device prepared by the method for preparing the same according to the invention, by applying different voltages on an electro-conversion film, the structure of the electro-conversion film is changed, so that the contact angle between the electro-conversion film and a polar fluid is changed, thereby the object of controlling the aggregating and expanding of a nonpolar fluid can be attained. By the invention, it may be avoided that the property of the polar fluid is influenced by energization, thus it is favourable to prolong the service life of a display device; this effect is especially apparent when the polar fluid is water.

DETAILED DESCRIPTION OF THE PREFERRED EMBODIMENTS

Figure 1:
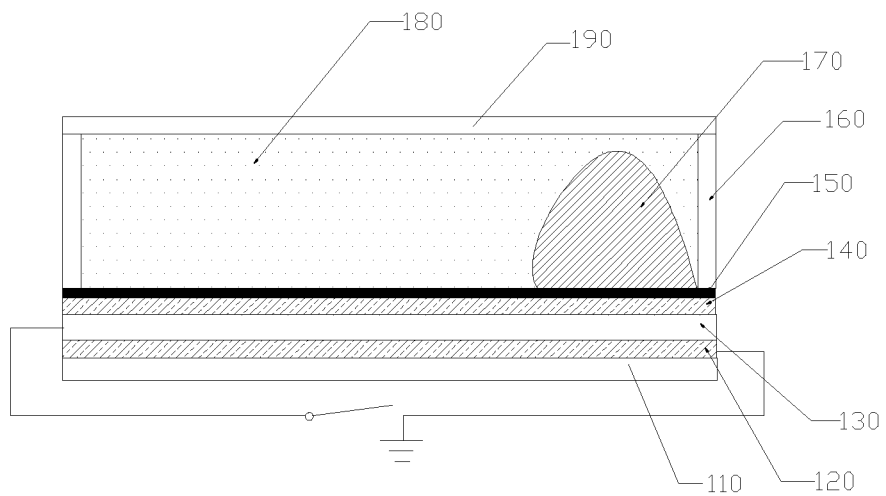
FIG. 1 is one side view showing the structure of an electrowetting display device according to an embodiment of the invention.

The invention will be further illustrated below in conjunction with the drawings and embodiments.

Embodiment 1

As shown in FIG. 1-FIG. 4, the electrowetting display device according to this embodiment includes several fluid chambers and a polar fluid 180 accommodated in the fluid chambers, wherein the fluid chamber comprises a base, the base includes an electro-conversion film 150, a first electrode 140 and a second electrode 120 which are insulated from each other.

The mutual insulation between the first electrode 140 and the second electrode 120 is achieved by providing an insulating layer 130. The insulating layer 130 is located between the first electrode 140 and the second electrode 120, and the electro-conversion film 150 is located on one side of the first electrode 140 that is adjacent to the polar fluid 180.

The contact angle between the electro-conversion film 150 and the polar fluid 180 converts in the range from a first contact angle to a second contact angle according to the voltage applied on the first electrode 140.

The first contact angle is no larger than 25 degrees, and the second contact angle is no less than 90 degrees.

Specifically, the contact angle between the electro-conversion film 150 and the polar fluid 180 may be made to convert in the range from a first contact angle to a second contact angle according to the positive and negative values of a voltage applied on the first electrode 140.

Figure 5A:
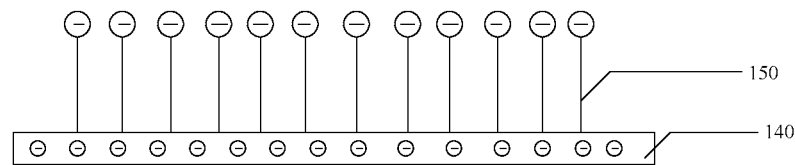
FIG. 5A and FIG. 5B are schematic diagrams showing a hydrophobic state and a hydrophilic state of an electro-conversion film respectively.
Figure 5B:
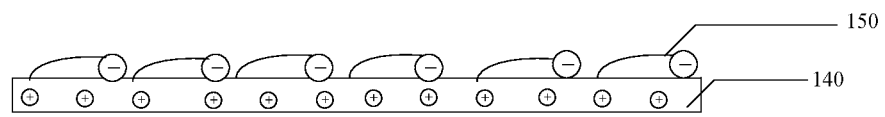

When the polar fluid is water, the electro-conversion film 150 may be formed of a material of which the molecule contains a hydrophilic group and a hydrophobic group. In a specific example, the material includes a material of which the molecule contains an alkyl, a benzene ring-containing group, a carboxyl group or a fluorine group and a thiol group, wherein the thiol group and the carboxyl group are hydrophilic groups, while the alkyl, the benzene ring-containing group and the fluorine group are all hydrophobic groups. For example, the electro-conversion film may be formed of (16-Mercapto)hexadecanoic acid (MHA). The principle for converting the contact angle between the electro-conversion film and a polar fluid will be illustrated by taking (16-Mercapto)hexadecanoic acid as an example. As shown in FIG. 5A and FIG. 5B, the chain segment of (16-Mercapto)hexadecanoic acid has an oxygen atom carrying electrons, and when a negative voltage is applied on the first electrode 140, due to the principle of like charges repelling from each other, the electro-conversion film 150 will represent a lipophilic state (that is, the contact angle with the polar fluid is large, and it will be the second contact angle); when a positive voltage is applied on the first electrode 140, due to the principle of unlike charges attracting each other, the electro-conversion film 150 will represent a hydrophilic state (that is, the contact angle with the polar fluid is small, and it will be the first contact angle). By applying different voltages on the first electrode, the conversion between the first contact angle and the second contact angle between the polar fluid and the electro-conversion film can be achieved.

The first contact angle is no larger than 25 degrees, and the second contact angle is no less than 90 degrees. The specific value of the first contact angle may be 20 degrees, 15 degrees, 10 degrees or 0 degree, etc., and the specific value of the second contact angle may be 90 degrees, 95 degrees, 100 degrees, 120 degrees, 130 degrees, 150 degrees or 160 degrees, etc.

Figure 3:
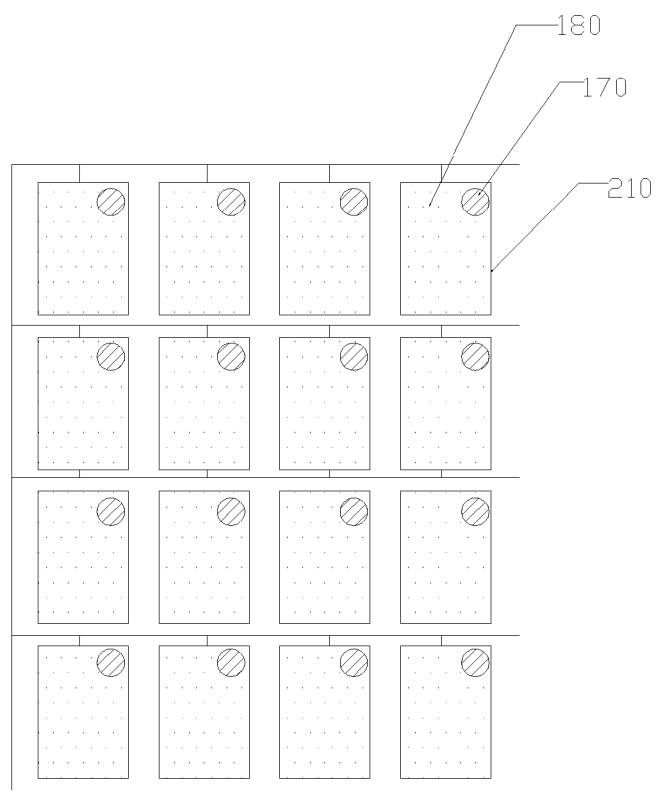
FIG. 3 is one top view showing the structure of an electrowetting display device according to an embodiment of the invention.

The smaller the contact angle is, the larger the adhesive force of a fluid to the surface of a solid will be. When the contact angle is smaller than a certain degree, the adhesive force of the fluid to the surface of a solid will be larger than the cohesive force of the fluid, so that it will expand on the surface of the solid. According to the above principle, when the contact angle between the polar fluid 180 and the electro-conversion film 150 is the first contact angle, the adhesive force between the polar fluid 180 and the electro-conversion film 150 will be large, so that the polar fluid 180 will expand on the electro-conversion film 150 under the action of the adhesive force, thus the nonpolar fluid 170 will be pushed to a corner, thereby the nonpolar fluid 170 will shrink, as shown in FIG. 1 and FIG. 3 specifically.

Figure 2:
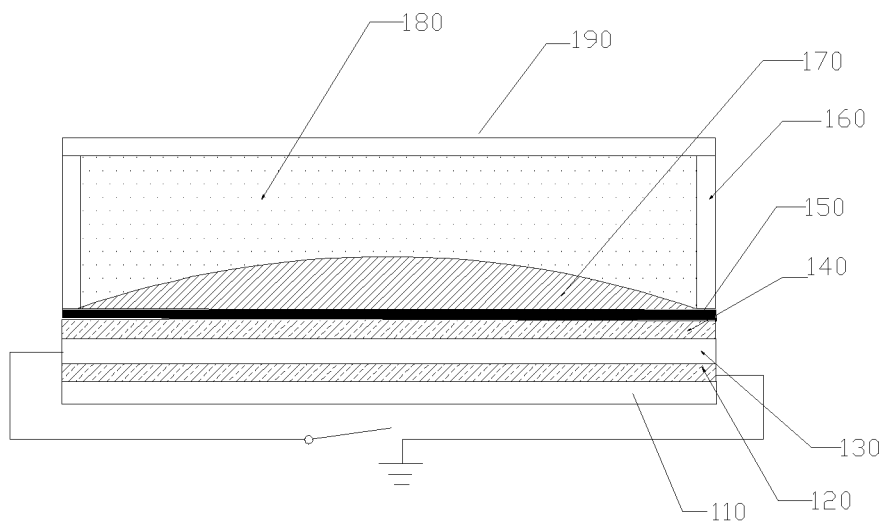
FIG. 2 is another side view showing the structure of an electrowetting display device according to an embodiment of the invention.
Figure 4:
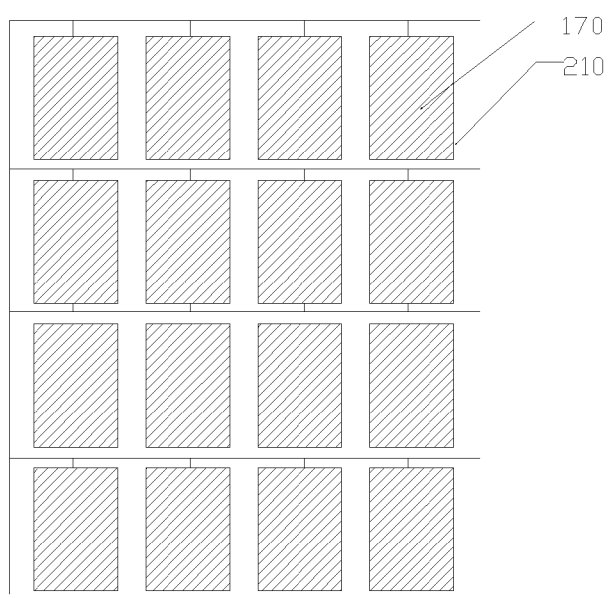
FIG. 4 is another top view showing the structure of an electrowetting display device according to an embodiment of the invention.

The larger the contact angle is, the smaller the adhesive force of a fluid to the surface of a solid will be. When the contact angle is larger than a certain degree, the adhesive force of the fluid to the surface of a solid will be less than the cohesive force of the fluid. When the contact angle between the polar fluid 180 and the electro-conversion film 150 is the second contact angle, the adhesive force of the polar fluid 180 to the surface of the electro-conversion film 150 will be small, so that the nonpolar fluid 170 will expand on the electro-conversion film 150 under the action of the flowability of the fluid, specifically as shown in FIG. 2 and FIG. 4. The electrowetting display device includes a pixel matrix, wherein each pixel at least corresponds to one fluid chamber, and label 210 in FIGS. 3 and 4 represents one pixel thereof.

In FIG. 1 and FIG. 2, label 110 represents a first substrate, label 190 represents a second substrate that is oppositely arranged with the first substrate to form a cell, and label 160 represents a retaining wall of the fluid chamber formed. In a specific manufacturing process, the retaining wall may be a black matrix or a sealant formed on the first substrate.

In this embodiment, the electro-conversion film 150 changes its contact angle with the polar fluid 180 according to the voltage applied to the first electrode 140 and the second electrode 120, so that the conversion between the dark state and the bright state of a pixel may be realized. Compared with a traditional electrowetting display device in which a polar fluid changes its shape under the action of a voltage by directly energizing on the two sides of the polar fluid, the electrowetting display device according to this embodiment changes the voltage applied on two electrodes to control the change of the property of the electro-conversion film by configuring a electro-conversion film and arranging the two electrodes on one and the same side of the fluid chamber, thereby changing the contact angle between the electro-conversion film and the polar fluid. Because no voltage is directly applied on the two sides of the polar fluid, it may be avoided that chemical or physical change (for example, electrolysis, etc.) occurs on the polar fluid under the action of an electric field, which may cause problem that the stability of the polar fluid becomes poor and the service life of the electrowetting display device is shorted; moreover, the electric energy consumed by the chemical or physical change of the polar fluid may be reduced, thus the power consumption of the display device may be lowered.

During a specific implementation process, the electro-conversion film may be conducting or insulating; for example, it may be an insulating electro-conversion film. By employing an insulating electro-conversion film, it may be further prevented that chemical or physical change occurs on the polar fluid in a region adjacent to the surface of the electro-conversion film, so that the power consumption may be further lowered, and the life time of the electrowetting display device may be prolonged.

As a further improvement of this embodiment, the first contact angle in the electrowetting display device according to this embodiment is no larger than 10 degrees, and the second contact angle is no less than 150 degrees. That is, it may convert between super-hydrophobicity and super-hydrophilicity between the polar fluid and the electro-conversion film, so that the converting speed of the polar fluid may be accelerated, and the response speed of the electrowetting display device may be improved.

Figure 6:
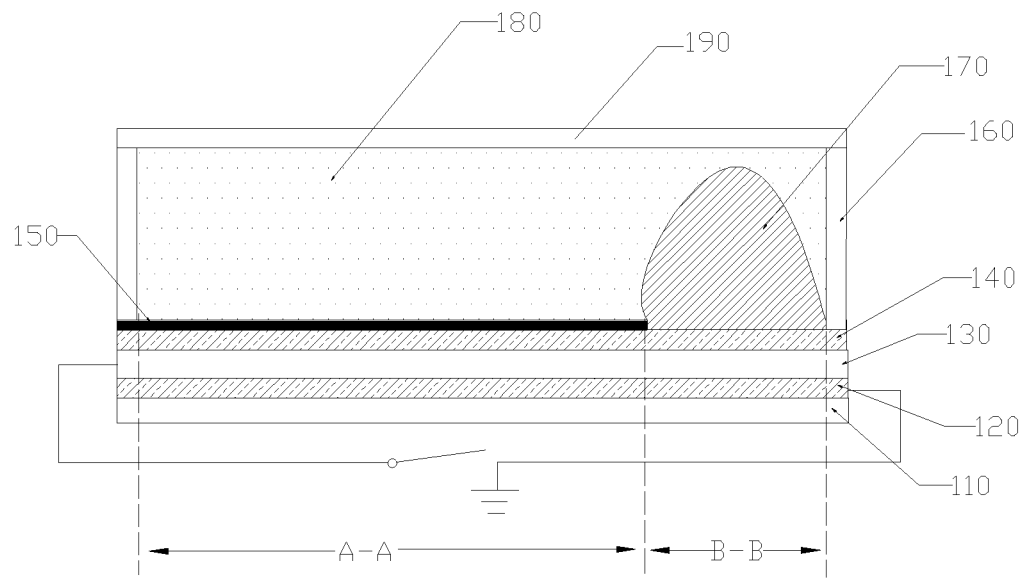
FIG. 6 is yet another side view showing the structure of the fluid chamber of an electrowetting display device according to an embodiment of the invention.

In a specific implementation process, a nonpolar fluid, which is insoluble in the polar fluid, is further provided in the fluid chamber, and the first electrode 140 and the electro-conversion film 150 may be located on the whole undersurface of the fluid chamber in which they exist. However, for the purpose of accelerating the response speed of the electrowetting display device and restricting the shrinking tendency of the nonpolar fluid 170, as shown in FIG. 6, further improvement may be made in this embodiment, and the specific improvement may be as follows:

the fluid chamber is divided into a shrinking region B-B and an expanding region A-A;

the shrinking region B-B is used for the aggregation of the nonpolar fluid, and as shown in FIG. 6, the nonpolar fluid is located in the shrinking region B-B after shrinking; and the electro-conversion film 150 is only provided in the expanding region A-A.

Because no electro-conversion film is provided in the shrinking region B-B, the adhesive force between the polar fluid in the shrinking region B-B and the film in the region of the bottom part of the fluid chamber, on which no electro-conversion film is provided, is smaller than that in the expanding region A-A even if the contact angle between the polar fluid and the electro-conversion film is the first contact angle, and the polar fluid will flow from the region with a small adhesive force to the region with a large adhesive force, that is, from the shrinking region B-B to the expanding region A-A, and the nonpolar fluid will flow from the expanding region A-A to the shrinking region B-B, so that the resistance to the shrinking of the nonpolar fluid will be reduced, thus the response speed of the electrowetting display device will be accelerated. Additionally, the fluid chamber is divided into a shrinking region and an expanding region, and the electro-conversion film is provided in the expanding region, thus the moving direction of the nonpolar fluid during shrinking may be controlled.

During a specific implementation process, the first electrode may cover the whole undersurface of the fluid chamber in which it exists. However, in view of energy saving, in this embodiment, further improvement is made based on the above technical solution, that is, the first electrode is only located in the expanding region, so that the area of the first electrode may be reduced, and the quantity of electricity consumed by the first electrode to cover the part of the shrinking region may be reduced, thereby an effect of lowering the power consumption may be attained.

The first electrode may be a plate electrode overspreading on the expanding region, or it may be a comb electrode formed by connecting several strip electrodes.

Specifically, there are many types of polar fluids and nonpolar fluids. In this embodiment, the polar fluid may be water, and the nonpolar fluid may be a pigment-containing oil layer. When the polar fluid is water, water electrolysis will not be caused because a voltage is directly applied on water (the reaction after water electrolysis is irreversible), so that the display life time of the electrowetting display device may be prolonged, and a good display effect may be guaranteed in a long time. The pigment contained in the nonpolar fluid may be set as required, for example, when the electrowetting display device is a black-and-white display device, the pigment contained in the oil layer may be black; when the electrowetting display device is a color display device, the pigment contained in the oil layer may be any one of the three primary colors, i.e., red, blue and green, or one of other colors that may realize color display.

During a specific implementation process, for example, the first electrode is a metal electrode, such as gold electrode and aluminium electrode, etc. Metal has a reflection effect, and when it is used for a reflective electrowetting display device, the providing of a reflecting layer may be omitted, thus the structure may be simplified.

In conclusion, compared with the traditional electrowetting display device, the electrowetting display device according to this embodiment is configured with an electro-conversion film, and the two electrodes for generating a voltage difference are provided on one and the same side of the fluid chamber, so that the problem of unstable property of the polar fluid caused by the voltage applied on the two sides of the polar fluid may be avoided effectively, thus the service life of the electrowetting display device may be prolonged effectively, and further the power consumption can be lowered, and a good display effect may be guaranteed for a long time.

Embodiment 2

The method for preparing an electrowetting display device according to this embodiment is used for forming the electrowetting display device according to any one the technical solutions in Embodiment 1. In comparison with a traditional preparation method, a change occurs in the step of manufacturing the base of a fluid chamber in the method for preparing an electrowetting display device according to this embodiment. Specifically, the method form preparing the base of the fluid chamber includes the steps of:

Step 1: forming a pattern including a second electrode on a first substrate;

Step 2: forming a pattern including a first electrode that is insulated from the second electrode on the structure formed by the Step 1; and Step 3: forming a pattern including an electro-conversion film on the pattern including a first electrode that is formed in the Step 2.

Specifically, a patterning process may be employed to form any pattern in the above Step 1 to Step 3. The patterning process includes one or more subprocesses of depositing, coating, exposing, developing and etching, etc.

During a specific implementation process, an insulating layer may be provided between the first electrode and the second electrode to achieve insulation.

Specifically, the first electrode and the second electrode are both formed of a metal material, for example, a conducting metal such as gold, aluminium and copper, etc. For example, the material is gold. When the electrowetting display device formed is a reflective display device, the first electrode employs a metal material, and because a metal material usually has reflection property, the manufacturing of a reflecting layer may be omitted.

Specifically, after the base is prepared, the preparation method further includes:

forming a retaining wall of the fluid chamber on the pattern including an electro-conversion film, wherein, during the specific manufacturing process, the retaining wall may be formed of a black matrix, or it may be formed of a sealant;

adding a polar fluid and a nonpolar fluid dropwise into the fluid chamber; and oppositely arranging a second substrate and the first substrate on which the above steps have been performed, to form a cell.

In conclusion, in comparison with the traditional electrowetting display device, the electrowetting display device prepared by the method of this embodiment changes the realization mode of the change of the shape of the polar fluid and the nonpolar fluid by adding an electro-conversion film, so that the stability of the polar fluid may be improved, which is favourable to prolong the life time of the electrowetting display device; moreover, the manufacturing process will be more simple compared with the traditional process.

Figure 7:
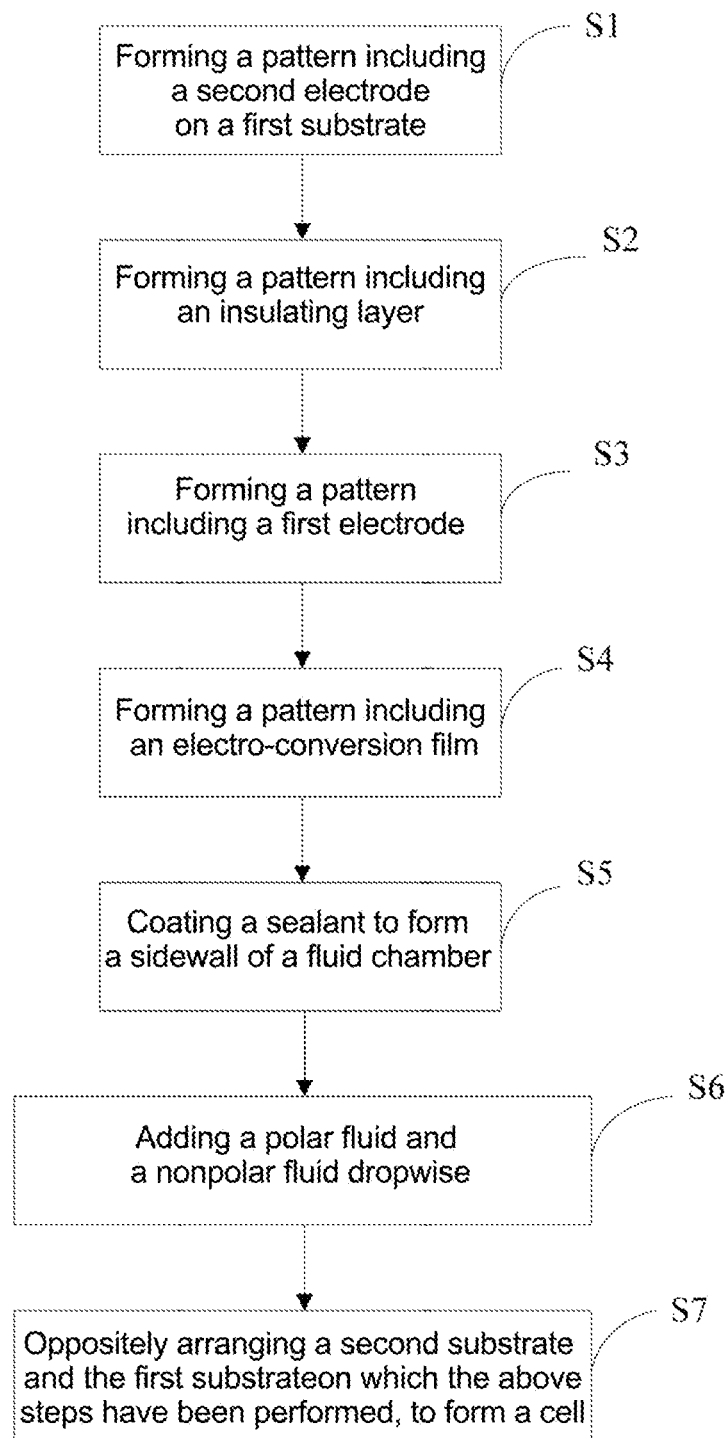
FIG. 7 is a flow chart of a method for preparing an electrowetting display device according to an embodiment of the invention.

As shown in FIG. 7, the specific Steps S1-S7 for preparing an electrowetting display device according to this embodiment is given below.

Step S1: forming a pattern including a second electrode on a first substrate. Specifically, a conducting layer is deposited on a lower substrate (or, a first substrate), wherein the conducting layer is, for example, a metal layer such as a gold layer, and then it is etched pixel by pixel to form the second electrode of the corresponding pixel.

Step S2: manufacturing a pattern including an insulating layer. Specifically, a layer of an insulating material is deposited or coated on the conducting metal layer to form the insulating layer.

Step S3: forming a pattern including a first electrode. Specifically, another conducting layer is deposited on the insulating layer, wherein the conducting layer may be, for example, a metal layer such as a gold layer, and a first electrode corresponding to a pixel is formed via a patterning process.

Step S4: forming a pattern including an electro-conversion film. Specifically, a pattern including an electro-conversion film corresponding to each pixel is formed by depositing or coating an electro-conversion film material, coating a photoresist on the electro-conversion film material and performing an exposing and developing process, an etching process and the like on the photoresist.

Step S5: forming a sidewall of a fluid chamber on the structure formed in Step S4, thereby forming an uncapped fluid chamber. Specifically, the method for forming the sidewall may be providing a black matrix, or coating a sealant.

Step S6: providing a polar fluid and a nonpolar fluid, for example, water and pigment-containing oil, in the uncapped fluid chamber formed in the Step S5. In the specific realization method, the polar fluid and the nonpolar fluid may be added dropwise. By adding dropwise, the amount of the polar fluid and the nonpolar fluid added may be controlled precisely, so that a good display effect may be obtained.

Step S7: oppositely packaging the first substrate and the second substrate to form a cell, thereby making the fluid chamber form a closed chamber, thereby forming the electrowetting display device according to any solution of Embodiment 1.

In the electrowetting display device prepared by the method of this embodiment, by adding an electro-conversion film, the structure and location of the electrode are adjusted, thus the stability of the polar fluid may be improved, the service life of the electrowetting display device may be prolonged, and the manufacturing process may be simplified relative to the prior process.

The above embodiments are only used for illustrating the invention, rather than limiting the invention thereto. Various modifications and variations may also be made by one skilled in the art without departing from the spirit and scope of the invention. Therefore, all the equivalent technical solutions pertain to the scope of the invention, and the protection scope of the invention should be defined by the appended claims.

What is claimed is:

1. An electrowetting display device, comprising several fluid chambers and a polar fluid accommodated in the fluid chambers, wherein:

the fluid chamber comprises a base, and the base comprises a first electrode and a second electrode that are insulated from each other and an electro-conversion film, wherein the electro-conversion film is located on one side of the first electrode that is adjacent to the polar fluid;

wherein, the contact angle between the electro-conversion film and the polar fluid converts in the range from a first contact angle to a second contact angle according to a voltage applied to the first electrode;

the first contact angle is no larger than 25 degrees, and the second contact angle is no less than 90 degrees.

2. The electrowetting display device according to claim 1, wherein, the first contact angle is no larger than 10 degrees, and the second contact angle is no less than 150 degrees.

3. The electrowetting display device according to claim 1, wherein, the electro-conversion film is formed of a material of which the molecule includes a hydrophilic group and a hydrophobic group;

wherein, the hydrophilic group comprises a thiol group and a carboxyl group, and the hydrophobic group comprises one or more of an alkyl, a benzene ring, a carboxyl group and a fluorine group.

4. The electrowetting display device according to claim 3, wherein, a nonpolar fluid is further provided in the fluid chamber, and the fluid chamber is divided into a shrinking region and an expanding region;

wherein, the shrinking region is configured for the aggregation of the nonpolar fluid, and the electro-conversion film is located in the expanding region.

5. The electrowetting display device according to claim 4, wherein, the first electrode is located in the expanding region.

6. The electrowetting display device according to claim 4, wherein, the polar fluid is water, and the nonpolar fluid is a pigment-containing oil layer.

7. A method for preparing the electrowetting display device according to claim 1, comprising:
   forming a pattern including a second electrode on a first substrate;
   forming a pattern including a first electrode that is insulated from the second electrode; and
   forming a pattern including an electro-conversion film on the pattern including a first electrode that is formed.

8. The method for preparing an electrowetting display device according to claim 7, further comprising:
   forming a retaining wall of the fluid chamber on the pattern including an electro-conversion film;
   providing a polar fluid and a nonpolar fluid in the fluid chamber; and
   oppositely arranging a second substrate and the first substrate on which the above steps have been performed, to form a cell.

9. The method for preparing an electrowetting display device according to claim 7, wherein, the fluid chamber is divided into a shrinking region and an expanding region, and the electro-conversion film is only formed in the expanding region.

10. The method for preparing an electrowetting display device according to claim 9, wherein, the first electrode is only formed in the expanding region.

11. The electrowetting display device according to claim 2, wherein, the electro-conversion film is formed of a material of which the molecule includes a hydrophilic group and a hydrophobic group;
   wherein, the hydrophilic group comprises a thiol group and a carboxyl group, and the hydrophobic group comprises one or more of an alkyl, a benzene ring, a carboxyl group and a fluorine group.

12. The electrowetting display device according to claim 11, wherein, a nonpolar fluid is further provided in the fluid chamber, and the fluid chamber is divided into a shrinking region and an expanding region;
   wherein, the shrinking region is configured for the aggregation of the nonpolar fluid, and the electro-conversion film is located in the expanding region.

13. The electrowetting display device according to claim 12, wherein, the first electrode is located in the expanding region.

14. The electrowetting display device according to claim 12, wherein, the polar fluid is water, and the nonpolar fluid is a pigment-containing oil layer.

15. The method for preparing an electrowetting display device according to claim 8, wherein, the fluid chamber is divided into a shrinking region and an expanding region, and the electro-conversion film is only formed in the expanding region.

16. The method for preparing an electrowetting display device according to claim 15, wherein, the first electrode is only formed in the expanding region.

* * * * *